United States Patent [19]

Slavik

[11] Patent Number: 4,907,222
[45] Date of Patent: Mar. 6, 1990

[54] VEHICLE MULTIPLEX SYSTEM
[75] Inventor: William H. Slavik, Palos Hills, Ill.
[73] Assignee: Nuvatec, Inc., Downers Grove, Ill.
[21] Appl. No.: 233,262
[22] Filed: Aug. 17, 1988
[51] Int. Cl.[4] ............................................. H04J 3/00
[52] U.S. Cl. ............................... 370/85.7; 370/100.1; 307/10.1
[58] Field of Search ...................... 370/85, 95, 92, 77; 340/53, 52 R, 52 D, 22, 422.5; 307/10 R

[56] References Cited

U.S. PATENT DOCUMENTS

| | | | |
|---|---|---|---|
| 3,525,875 | 8/1970 | Ziomek | 307/10 |
| 3,651,454 | 3/1972 | Venema et al. | 340/52 F |
| 3,864,578 | 2/1975 | Lackey | 307/10 R |
| 4,099,157 | 7/1978 | Enabnit | 340/52 F |
| 4,139,737 | 2/1979 | Shimada et al. | 179/15 Al |
| 4,156,232 | 5/1979 | Blass | 340/168 R |
| 4,227,181 | 10/1980 | Brittain | 340/167 R |
| 4,293,947 | 10/1981 | Brittain | 370/92 |
| 4,370,561 | 1/1983 | Briggs | 370/85 |
| 4,453,088 | 6/1984 | Moore | 307/10 R |
| 4,463,341 | 7/1984 | Iwasaki | 340/310 A |
| 4,503,431 | 3/1985 | Raab | 340/870.13 |
| 4,584,487 | 4/1986 | Hesse et al. | 307/10 R |
| 4,639,609 | 1/1987 | Floyd et al. | 307/10 R |
| 4,677,308 | 6/1987 | Wroblewski et al. | 307/10 R |
| 4,682,168 | 7/1987 | Chang et al. | 370/92 |
| 4,736,367 | 4/1988 | Wroblewski et al. | 370/85 |

Primary Examiner—Douglas W. Olms
Assistant Examiner—Min Jung
Attorney, Agent, or Firm—Willian Brinks Olds Hofer Gilson & Lione

[57] ABSTRACT

A time division multiplex system for motor vehicles and other applications in which data signals are adapted to be sent through the system in cyclical fashion during each of a series of time periods. The system includes a communication line, a master unit connected to the communication line which includes a pulse-generating circuit for sending a plurality of timing signals out over the line for defining a plurality of time slots during each time period, and a plurality of transceiver units connected to the communication line. Each of the transceiver units is operable in either a transmit mode or a receive mode and includes an address-decoding circuit for identifying a selected one of the plurality of time slots on the line during each time period, a data-signal-transmitting circuit operable when the transceiver is in a transmit mode for sending the data signal out onto the line during the selected time slot, and a data-signal-receiving circuit operable when the transceiver is in a receive mode for receiving a data signal from the line during the selected time slot. With the system of the present invention, data can be transferred onto the line from any one transceiver and received from the line by any other transceiver or transceivers to provide a system having a great deal of flexibility. The system also includes circuitry to permit power for the transceivers to be sent over the single communication line from the master unit.

18 Claims, 6 Drawing Sheets

VEHICLE MULTIPLEX SYSTEM

BACKGROUND ART

The present invention relates generally to a multiplex system, and, more particularly, to a time division multiplex system for motor vehicles and other applications.

Motor vehicles have traditionally used conventional point-to-point wiring systems to provide power to and to control or monitor the operation of various equipment positioned throughout the vehicle. In recent years, however, tremendous demands have been placed on the wiring systems of boats, rv's, and other vehicles due to the numerous safety devices that are now required and the many amenities that are now available and that consumers desire in their vehicles. The increase in the size and complexity of vehicular wiring systems necessitated by this additional equipment has resulted in wiring systems which occupy excessive space in the vehicle, and which are costly to manufacture and difficult to service.

One proposed solution to the problem of the increasing complexity of conventional, vehicle-wiring systems is the use of a multiplex system. Multiplexing is a technique commonly used in the electronics arts to send two or more messages on the same wire and, in essence, permits many of the wires in a traditional vehicle wiring system to be replaced by electronics, thus reducing the complexity and space requirements of the wiring.

One form of multiplexing that has been proposed for vehicle applications is time division multiplexing in which a plurality of different signals is transmitted over a line in cyclical fashion and a plurality of receivers is connected to the line and is responsive to the signals to control vehicle components coupled to the receivers.

In some known multiplex systems, a single central transmitter generates a train of pulses which are encoded using, for example, pulse width or pulse amplitude modulation techniques. Each receiver is responsive to a particular pulse in the train and decodes the pulse to determine whether or not its associated load should be activated. In other known systems, a plurality of transmitter-receiver pairs is connected to a communication line, and each transmitter transmits a data signal over the line which is adapted to be received by its associated receiver to control a load coupled to the receiver. In such systems, each transmitter-receiver pair is typically allotted a particular time channel to transmit signals over the line.

Many vehicle multiplex systems include two or more wires or busses to transmit power, data, and timing signals through the system. Such systems tend to be costly to manufacture and difficult to service, particularly in the field. Other systems require only a single wire to carry power, timing, and data signals through the system; however, these systems are often complex in design and tend to be limited in their capabilities.

DISCLOSURE OF THE INVENTION

The present invention provides a time division multiplex system for motor vehicles and other applications in which data signals are adapted to be sent through the system in cyclical fashion during each of a series of time periods. The system includes a communication line which includes a pulse generating circuit for sending a plurality of timing signals out over the line for defining a plurality of time slots during each time period, and a plurality of transceiver units connected to the communication line. Each of the transceiver units is operable in either a transmit mode or a receive mode and includes an address-decoding circuit for identifying a selected one of the plurality of time slots on the line during each time period, a data signal transmitting circuit operable when the transceiver is in a transmit mode for sending a data signal out onto the line during the selected time slot, and a data signal receiving circuit operable when the transceiver is in a receive mode for receiving a data signal from the line during the selected time slot.

With the system of the present invention, any of the transceivers can be operated in a transmit mode to transmit data onto the line to be received by any one or more of the other transceivers, or in a receive mode to receive data from the line from any of the other transceivers. Each transceiver may be connected to a load, for example, through a power-switching circuit, to control the operation of the load when the transceiver is operated in a receive mode or to transmit data onto the line indicative of the condition of the load when in a transmit mode. The system of the present invention thus provides tremendous flexibility, permitting its use in a wide variety of vehicular and other applications.

In accordance with a presently preferred embodiment, the master unit includes means for normally maintaining the line at a first elevated voltage level; and the pulse-generating circuit includes means for sending timing signals onto the line at a second elevated voltage level which is higher than the first voltage level. Each of the transceivers further includes a power supply circuit for rectifying the timing signals on the line to provide power for the circuits in the transceivers. Thus, with the system of the present invention, power is also supplied to the transceivers through the single communication line, providing a multiplex system which requires only a single line to transmit power, timing signals, and data signals through the system, resulting in a system of reduced complexity which is less costly to manufacture and easier to service.

According to a further aspect of the invention, the address-decoding circuit of each transceiver includes a timing signal separator circuit for separating timing signals on the line from other signals on the line, and a counter coupled to the timing signal separator circuit for providing an output indicative of a selected time slot which is used as a first input to a NAND gate. The data-receiving circuit of each transceiver includes a data separator circuit for separating data signals on the line from other signals on the line and for producing an output indicative of the presence of data signals on the line.

When the transceiver is operated in a receive mode, the output of the data separator circuit is connected to the second input of the NAND gate. When a signal is present at both inputs, the NAND gate produces an output indicative of the presence of a data signal on the line in the selected time slot. This data signal can then be directed to a switching circuit or otherwise used to control a load connected to the transceiver.

When the transceiver is operated in a transmit mode, the second input to the NAND gate is connected to the switching circuit or other signal generating means; and when a signal appears at both inputs to the NAND gate, the resulting gate output operates to send a data signal onto the line in the selected time slot.

In most preferred embodiment of the present invention, each time period includes ten time slots, each of which are about three milliseconds in length, permitting ten data signals to be carried on the line simultaneously. Although this is a relatively slow operating speed for a multiplex system, it is sufficient for most vehicle applications and provides several advantages. For example, the slow operating speed of the system minimizes interference problems from external sources such as engine ignitions or CB radios, tends to prevent the system from causing interference on external equipment, and permits the use of conventional wires. The system is also particularly suitable for use on vehicles which have a common chassis ground, as it permits the wiring requirements of the system to be maintained at an absolute minimum.

Further advantages and specific features of the invention will be set forth hereinafter in conjunction with the following detailed description of the presently preferred embodiment.

BRIEF DESCRIPTION OF DRAWINGS

FIG. 2 illustrates a time period divided into a plurality of time slots; FIG. 3 illustrates synchronizing and clock pulses on the communication line of the system of FIG. 1 to define the plurality of time slots of FIG. 2; and FIG. 4 additionally illustrates data signals on the communication line of the system of FIG. 1 during various of the time slots of FIG. 3;

BEST MODE FOR CARRYING OUT THE INVENTION

Figure 1:
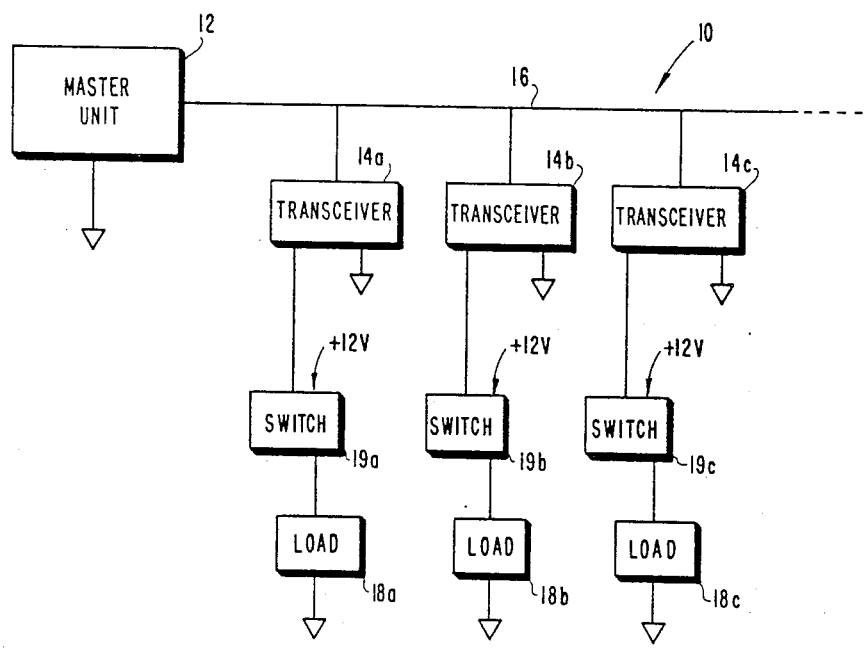
FIG. 1 is a block diagram of a time division multiplex system, according to a presently preferred embodiment of the invention.

FIG. 1 is a block diagram of a time division multiplex system according to a presently preferred embodiment of the invention. The system is generally designated by reference numeral 10 and includes a number of features which make it particularly suitable for use in recreational vehicles, boats, and other vehicles to control or monitor the operation of various equipment on the vehicle.

System 10 includes a master unit 12 and a plurality of transceiver units 14a, 14b, 14c, etc., connected to a single communication line or wire 16. As will be described more fully hereinafter, master unit 12 includes circuitry for generating and transmitting timing pulses over line 16 and, in addition, is connected to the vehicle power supply to supply power over line 16 to operate the transceivers. Transceivers 14a, 14b, 14c, etc., are connected to line 16 and each includes a data-signal-transmitting circuit for generating and transmitting data signals onto line 16, and a data-signal-receiving circuit for receiving data signals from line 16.

Multiplex system 10 is particularly designed for use in multi-point, power-switching applications Thus, as shown in FIG. 1, each transceiver 14a, 14b, 14c, etc., is connected to a switch circuit 19a, 19b, 19c, etc., which, in turn, is connected to a load 18a, 18b, 18c, etc., whereby each transceiver can be used to control or to monitor the operation of its associated load.

Figure 2:
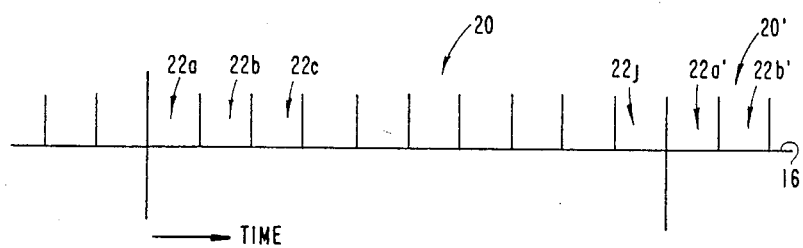
FIGS. 2-4 schematically illustrate various aspects of the operation of the multiplex system of FIG. 1 to assist in understanding the invention.

Multiplex system 10 comprises a time division multiplex system which operates by dividing time into a plurality of time slots, and then using wire 16 to carry a different data signal during each of the time slots. In particular, as shown in FIG. 2, system 10 divides time into a continuous series of identical time periods or cycles 20, and, in addition, further divides each time period into a plurality of time slots 22a, 22b, 22c, etc. During the first time slot 22a of a time period, a first data signal can be sent along wire 16; during the second time slot 22b, a second data signal can be sent, and so forth until all of the time slots in the time period 20 have been used. The system then starts over again during the next time period 20' such that each of the data signals is again sent over the wire during its respective time slot 22a', 22b', etc., of the next time period 20' in a continuous cyclic fashion.

As will be recognized by those skilled in the art, the number of time slots in a time period and the length of each time slot can vary greatly depending on the requirements of the particular application in which the multiplex system is to be used. In accordance with a presently preferred embodiment of the invention, however, and as illustrated in FIG. 2, system 10 divides each time period 20 into ten time slots 22, each of which is about three milliseconds (0.003 seconds) in length. Each time period 20, therefore, is 30 milliseconds (0.03 seconds) in length such that each data signal appears on wire 16 once every 30 milliseconds.

Inasmuch as a data signal appears on wire 16 once every 30 milliseconds during the operation of system 10, there can be a delay of up to 30 milliseconds before a change in a signal is sent through the system. Although such a delay is relatively long in electronic terms, it normally presents no problem in a vehicle environment or in other applications in which the system may be used. This is because in a vehicle environment, most events of interest require a finite time to happen, and introducing a slight delay into a system which controls or monitors those events rarely presents a problem to the user. In fact, delays of up to even one-tenth of a second are normally imperceptible to most people.

In addition, in a vehicle environment, the relatively slow speed provides several advantages. For example, the slow operating speed minimizes interference problems from external sources such as the engine ignition or CB radios, and tends to prevent the system from creating interference for radios, televisions, or other equipment which are commonly used on vehicles. The relatively slow speed also permits conventional wires to be used in the system and reduces current drain from the system.

In system 10, transceivers 14a, 14b, 14c, etc. are all connected to wire 16 (FIG. 1); and each of the transceivers sees all ten time slots of each time period. In order to be able to receive or transmit data during a particular time slot, however, the transceivers must be capable of distinguishing between the time slots and determining when each time slot begins and ends. This is accomplished in the system of the present invention by providing a pulse-generating circuit in master unit 12 which places timing signals on line 16 which are adapted to be monitored by the transceivers. The timing signals include synchronizing signals which indicate the beginning of each time period and the beginning of the first time slot of each time period, and clock signals which indicate the beginning of each of the next nine time slots in each time period. With this information on wire 16, each time slot can be assigned a particular function; and each transceiver is able to distinguish each time slot from all others and is thus able to transmit and receive data in a reliable manner.

Figure 3:
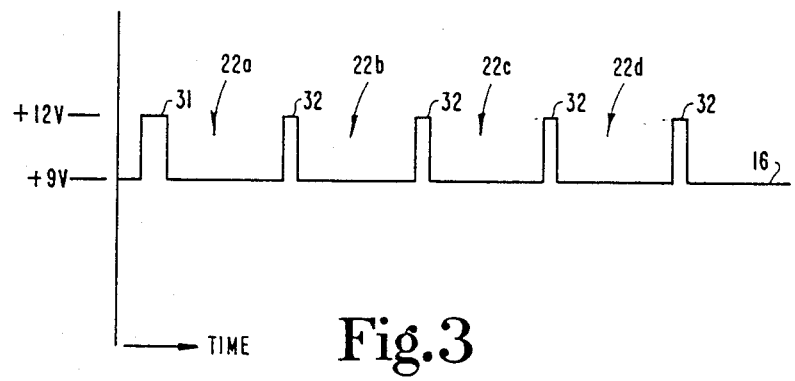

The time division multiplex system of the present invention utilizes a pulse train which consists of one long pulse and nine shorter pulses of equal amplitude to perform the synchronizing and clocking functions. FIG. 3 schematically illustrates a portion of a time period as it would appear on line 16 and shows a relatively long synchronizing pulse 31 and a plurality of shorter clocking pulses 32.

Synchronizing pulse 31, which indicates the start of the first time slot in a time period, is 600 microseconds (0.0006 seconds) in length, and the clock pulses 32 are 300 microseconds (0.0003 seconds) long. The difference in length between the pulses, i.e., the synchronizing signals are twice as long as the clock signals, permits the signals to be readily distinguished from one another to indicate the beginning of a time period or the beginning of each time slot in a time period. The synchronizing and clock pulses both go from about nine volts to about twelve volts as shown in FIG. 3 for a reason to be explained hereinafter.

As indicated previously, the ten time slots 22a, 22b, 22c, etc., between the pulses 31 and 32 of each time period 20 are reserved for the transmission of data signals on line 16. To transmit data, the voltage on line 16 during a particular time slot is lowered to about three volts. In FIG. 3, no data is being transmitted on line 16; while in FIG. 4, data signals 33 and 34 are being sent over line 16 during time slots 22b and 22d of a time period. To transmit data over line 16, any transceiver in the system can pull the signal line low during any given time slot; and any other transceiver can receive the signal by detecting that the signal line is low during that particular time slot. This permits any transceiver in the system to transmit data and any transceiver or transceivers in the system to receive data in a give time slot.

With the multiplex system 10 of the present invention, therefore, three classes of signal are carried on line 16: synchronizing, clock, and data signals. In addition, power for the transceivers is also supplied on line 16 via the clock and synchronizing signals as will be explained hereinafter.

Figure 5:
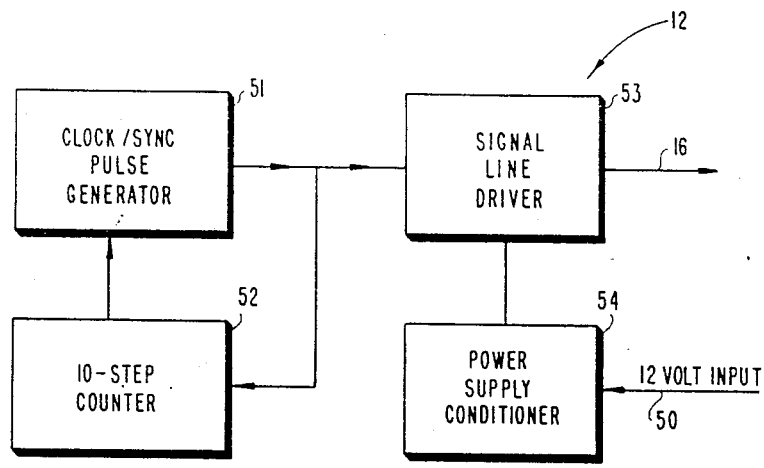
FIG. 5 is a block diagram of the master unit of FIG. 1.
Figure 6:
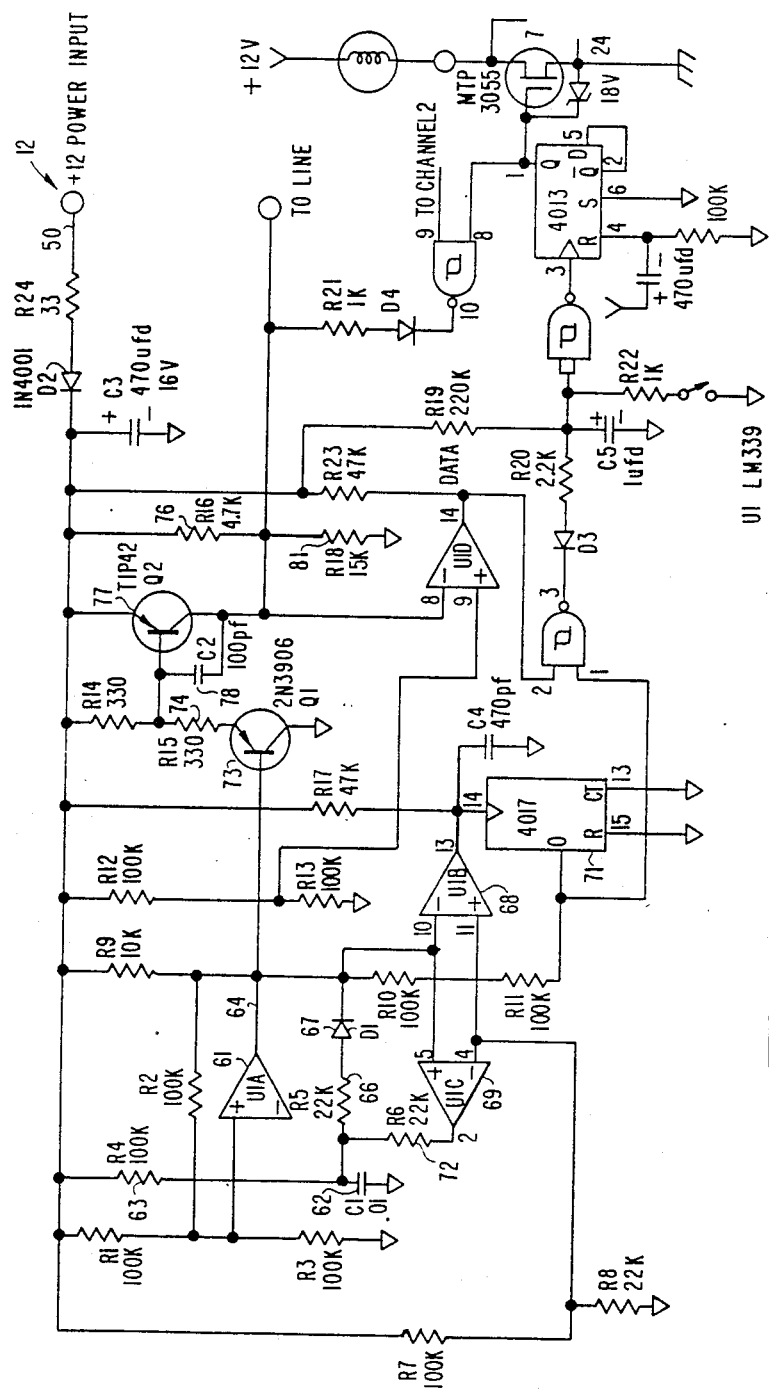
FIG. 6 is a detailed circuit diagram of the master unit of FIGS. 1 and 5.

FIG. 5 is a block diagram of master unit 12 of system 10, and FIG. 6 is a detailed circuit diagram of the master unit. Generally, the master unit comprises a pulse generator circuit which includes a clock/sync pulse generator circuit 51 for generating the synchronizing and clock pulses 31 and 32, and a signal line driver circuit 53 for placing the sync and clock pulses on line 16. The master unit further includes a ten-step counter circuit 52 and a power supply conditioning circuit 54. Clock/sync pulse generator circuit 51 generates the 300-microsecond clock pulses at a 3000 Hertz rate. These pulses are sent to signal line driver circuit 53 to be sent out over line 16 and to ten-step counter circuit 52. The ten-step counter circuit steps on each of the incoming pulses and provides an output pulse once for every ten input pulses. This one-tenth frequency pulse is sent back to clock/sync pulse generator circuit 51 where it is used to lengthen one out of every ten of the 300-microsecond clock pulses to a 600-microsecond sync pulse.

With reference to FIG. 6, the active element of clock/sync pulse generator circuit 51 is comparator 61. A capacitor 62 is charged through a resistor 63 until the inverting input of the comparator is higher than the non-inverting input. At that point, the output of comparator 61 on line 64 falls, dropping the voltage at the inverting input and discharging timing capacitor 62 through a resistor 66 and a diode 67. In addition, a portion of the output on line 64 is fed to comparators 68 and 69. Comparator 68 is used as an inverter to drive the clock input of the decade counter and one of ten decoder 71, a CD4017B. The count output of decade counter 71, which goes high at the "0" count, is fed to the non-inverting input of comparator 69 along with the output of comparator 61, forming an AND gate. In this way, the output of comparator 69 is held high during the "0" count. During the remaining nine counts, the output of comparator 69 follows the output of comparator 61, discharging capacitor 62 through resistor 72. This causes the discharge time of capacitor 62 to be longer on the "0" count than on the other nine counts, creating a pulse train of one long pulse and nine shorter pulses. The ratio of pulse width is basically determined by the ratio of resistors 66 and 72. As indicated previously, the resistors are preferably selected to provide a sync pulse that is twice the width of the clock pulses.

The output of the pulse generator on line 64 is fed to emitter-follower 73 (a PNP 2N3906) and through resistors 74 and 76 to the base of a line driver 77 (a PNP TIP42). This combination drives line driver 77 from cutoff to saturation.

A capacitor 78 is used to slow the rise and fall times of the pulses to reduce RF radiation from line driver 77. Resistors 76 and 81 form a divider, setting the voltage on line 16 at approximately seventy-five percent of the twelve-volt vehicle supply voltage (i.e., at about nine volts) which is input to the master unit from the vehicle power supply on power input line 50 when line driver 77 is switched off. These resistors also set the resistance of the line when the line driver is off.

The signal on line 16 during each time period is thus a series of nine twelve-volt pulses of about ten percent duty cycle and a tenth twelve-volt pulse of about twenty percent duty cycle with the line being at about seventy-five percent of the supply voltage (nine volts) the remainder of the time.

Figure 7:
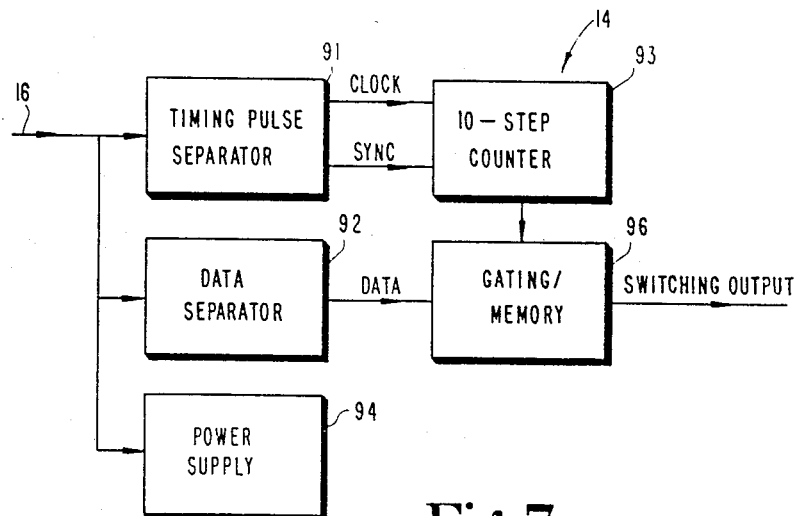
FIG. 7 is a block diagram of a transceiver unit of FIG. 1.
Figure 8:
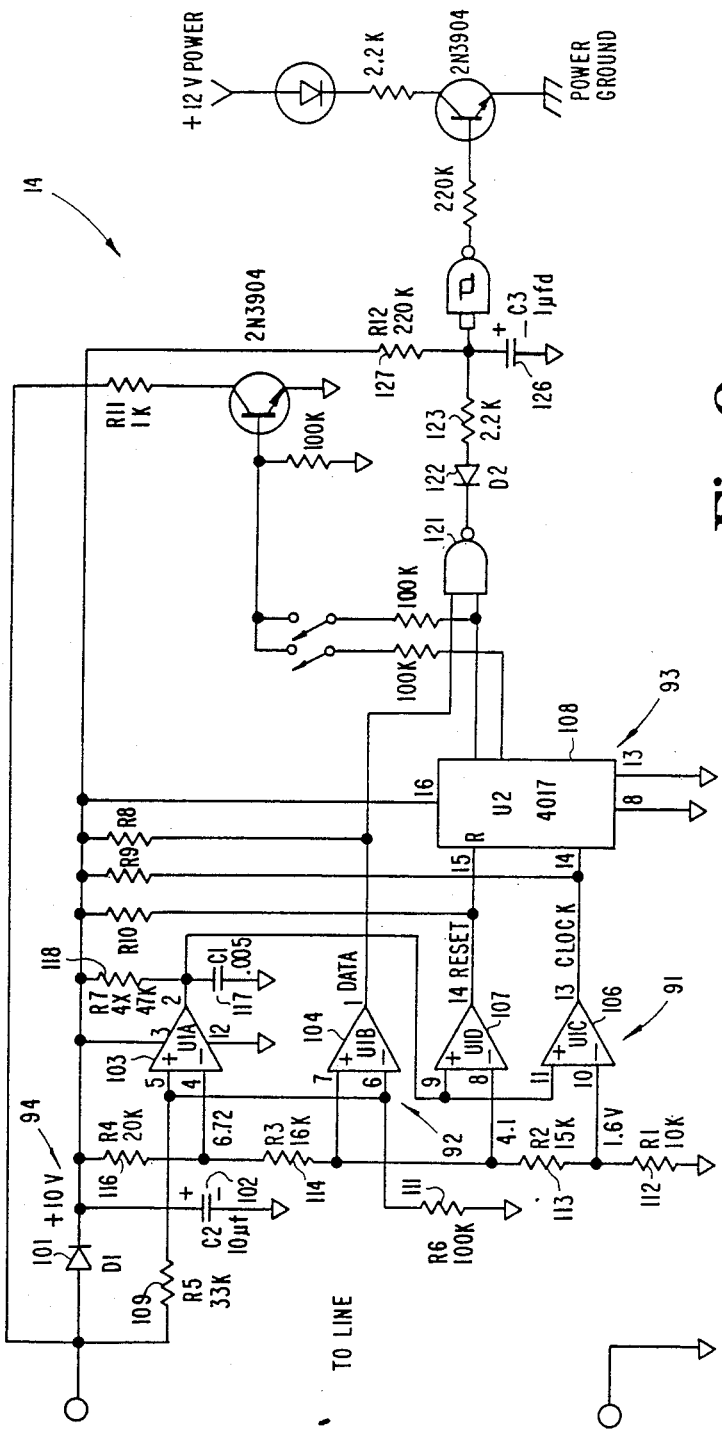
FIG. 8 is a detailed circuit diagram of a transceiver unit of FIGS. 1 and 7.

FIG. 7 is a block diagram of a transceiver 14, and FIG. 8 is a detailed circuit diagram of a transceiver. Inasmuch as the transceivers are identical, only one need be described herein. With reference to FIG. 7, each transceiver includes address-decoding circuitry which comprises a timing pulse separator circuit 91 and a ten-step counter circuit 93. In addition, each transceiver includes a data separator circuit 92, a power supply circuit 94, and a gating and memory circuit 96 which is appropriate for the particular application in which the system is to be used as will be explained hereinafter.

Figure 4:
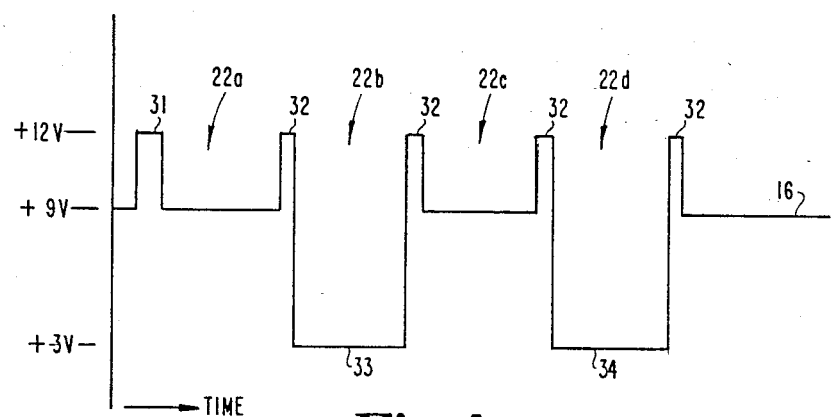

The signal on line 16 comes into the transceiver into three circuits, the timing signal separator circuit 91, the data separator circuit 92, and the power supply circuit 94. Power supply circuit 94 rectifies timing signals 31 and 32 on the line to provide power for the circuits in the transceiver This is permitted because, as shown in FIGS. 3 and 4, the voltage on line 16 is normally maintained at nine volts; and the timing pulses go from nine volts to twelve volts. Because all the power for the system is brought in through the master unit, power supply conditioning circuit 54 in the master unit is able to condition the power to protect the transceivers from spikes and to purify the power signal to allow the system to operate from a converter.

Figure 9:
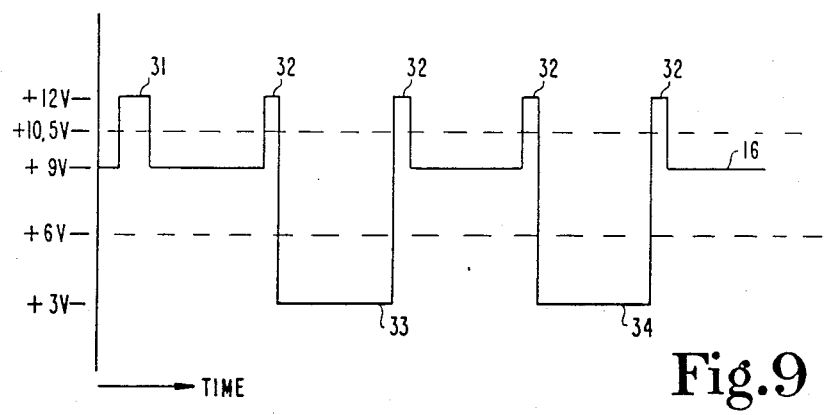
FIGS. 9-11 schematically illustrate the operation of the timing signal separator circuit and the data signal separator circuit of the transceivers of FIGS. 1, 7 and 8.
Figure 10:
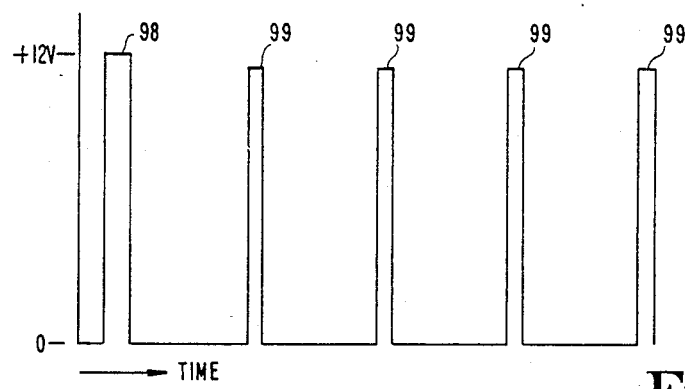

The timing signal separator circuit separates out the clock and sync signals from the signals on line 16 by comparing the input from line 16 to a 10.5-volt level which is derived from the power supply. Signals above that level are considered to be timing signals FIG. 9 illustrates the composite signal on line 16, and FIG. 10 illustrates separated sync and clock signals 98 and 99 output from timing signal separator circuit 91.

Once separated from the rest of the signal, the timing signal separator circuit detects the longer sync pulses and provides an output to ten-step counter 93 to assure that it is starting from the first count. Each successive clock pulse steps the counter one step. The ten-step counters in each of the transceivers and in the master unit are all synchronized together. Counter 93 has ten individual outputs, one for each of the ten steps which correspond to the ten time slots on the line in each time period.

Figure 11:
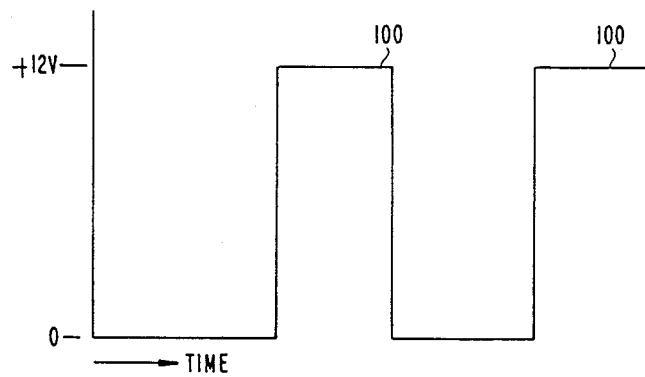

Data separator circuit 92 separates the data signals from the signals on line 16 by comparing the signal on the line to a six-volt level which is derived from the power supply. Signals below that value are considered to be "on" data signals. FIG. 11 illustrates the separated data signals 100 output from the data separator circuit 92.

To receive a signal from the line, a selected output from ten-step counter 93 and the separated data signal from the data separator circuit comprise first and second inputs to a NAND gate which provides an output whenever its two inputs are high. If there is an output from the NAND gate, that signal is what is appearing in the selected time slot on the signal line. The signal at the output of the NAND gate is a series of pulses that appear as long as the data signal is being sent. Once this signal is decoded in a transceiver, a number of different things can be done with it depending on the particular application.

To send a signal onto the line, the second input to the NAND gate is from a switching circuit 19 associated with the transceiver or another signal source. In the transmit mode, when tee two gate inputs are high, the output of the gate goes low and causes a data signal to be sent out onto the line during the selected time slot.

With reference to FIG. 8, at each transceiver 14, the signal on line 16 is first probed to a diode 101 which is used to peak detect the positive pulses supplied by line driver 77 of the master unit to serve as the power supply of the transceiver. This voltage is stored on a power filter capacitor 102 and is connected to comparators 103, 104, 106, 107 and to a CMOS decade counter and one of ten decoder 108 (a 4017). The signal is also divided down by resistors 109 and 111 to bring the signal down to a range usable by the comparators. Resistors 112, 113, 114, and 116 serve as a voltage divider to set the input levels of comparator 103, the clock/sync separator, and comparator 104, the data separator. As the signal on line 16 is lower than approximately ninety percent of peak, comparator 103 output is low, discharging and holding capacitor 117 at ground. When the line switches high, comparator 103 is turned off; and capacitor 117 begins to charge through resistor 118 forming a sawtooth. The time constant of these two components is selected to allow the voltage to rise to approximately twenty percent of supply during each of the nine short pulses. The capacitor is then rapidly discharged by comparator 103. During the tenth or long pulse, the voltage on capacitor 117 rises to approximately forty percent of supply since that pulse is twice as long in duration.

This train of pulses is applied to the inputs of comparators 106 and 107 which separate the sync and clock pulses. Resistors 112, 113, and 114 form a voltage divider to set the inputs of comparators 106 and 107 at approximately ten percent and thirty percent, respectively, of supply. In this way, the output of comparator 106 switches high on all ten pulses, delayed from the rise of the clock pulse on line 16. This output is fed to the clock input of CMOS decade counter and one in ten decoder 108 which clocks each time a clock pulse is detected on the line. The output of comparator 107 goes high only on the long sync pulse and is fed to the reset input of CMOS decade counter and one in ten decoder 108. This ensures 108 is switched in step with the decade counter and one in ten decoder of the master unit, and of all the other transceivers on the line.

To "send" a signal out on line 16 from a transceiver, a decoded output is fed to an input of a CMOS-NAND gate 121 such as a 4011 whose output is connected to the line through a diode 122 and series resistor 123. The other input of the NAND gate could be a switching circuit input as shown in FIG. 8 or another signal input source. If this "signal" input is held low, the output of the NAND gate is high and diode 122 is reverse biased. If this input is made high, however, the output of the gate goes low when the decoded output of 108 goes high. This happens during the high portion of the clock pulse on line 16. The line does not go low during this period since the line driver 77 of the master unit holds the line high during this period, and current from the NAND gate is limited by resistor 123. In this way, the timing of all transceiver transmissions is controlled by the master unit, thus eliminating the need for precise timing of all the transceiver clocks.

Additional signals can be "sent" in all ten time slots or channels. If additional transceivers attempt to send signals simultaneously in a given time slot, no deleterious effects occur. The first signal takes control and adding additional inputs during that particular time slot does not have an effect. In other words, once line 16 is pulled low by one transceiver, additional transceivers sending signals during that time slot are ignored.

To "receive" a signal from line 16, the data which was sent on line 16 is separated from the clock and sync signals by comparator 104, which provides a full rail-to-rail signal. This separated data is fed to the second input of NAND gate 121. The other input of the gate are fed from the decoded output of 108. When the two inputs are coincident, the output of the gate goes low for that period. This negative going pulse can be used to discharge a capacitor 126 through diode 122, which is being charged by resistor 127. The time constant of capacitor 126 and resistor 127 is long with respect to the repetition rate of the signal, producing a low steady state condition. This voltage is used to control a remote load 18 via switching circuit 19.

One application for the multiplex circuit of the present invention is in multi-point switching. For this application, decoded data pulses are detected and stored on a capacitor to provide a DC switching signal as indicated above. This switching signal is then used to drive a flip-flop, which stores the state of an on/off function. Each time the data signal goes from off to on, the flip-flop changes state.

In an alternative embodiment, several transceivers can transmit a momentary signal at different times, turning a single load which is controlled by the flip-flop on or off. An additional channel can be used to indicate the status or condition of the flip-flop at any or all remote locations.

Analog signals can also be sent over the system of the present invention without affecting the basic system in two different ways. Instead of simply pulling the line down through a resistor, the voltage on the line can be at a particular level during a given time slot. It can then be received at any or all remotes through a sample and hold scheme, reproducing the original, transmitted value. Alternatively, analog signals can be transmitted by varying the width of the low time relative to the high time during any time slot.

Digital signals can also be transmitted as a series of pulses on a particular channel. Rather than sending a continuous stream of pulses, such as with a DC signal, a synchronized series of pulses can be sent and then converted into data at any or all transceivers.

While what has been described constitutes a presently preferred embodiment of the invention, it should be understood that the invention can take numerous other forms. Because the invention can take numerous forms, it should be recognized that the invention should be limited only insofar as is required by the scope of the following claims.

I claim:

1. A time division multiplex system in which data signals are adapted to be sent through the system in cyclical fashion during each of a series of time periods, comprising:
    a communication line;
    a master unit connected to said communication line, said master unit including a pulse-generating circuit for sending a plurality of timing signals out over said line for defining a plurality of time slots during each time period; and
    a plurality of transceivers connected to said communication line, each of said transceivers being selectively operable in either a transmit mode to transmit data signals onto said line or in a receive mode to receive data signals from said line and including an address-decoding circuit for identifying a selected one of said plurality of time slots on said line during each time period, a data-signal-transmitting circuit operable when the transceiver is in a transmit mode for sending a data signal out onto said line during said selected time slot, and a data-signal-receiving circuit operable when the transceiver is in a receive mode for receiving a data signal from said line during said selected time slot, said data-signal-transmitting circuit and said data-signal-receiving-circuit including common circuit means for selectively connecting said address-decoding circuit to said data-signal transmitting circuit when said transceiver is operated in a transmit mode or to said data-signal-receiving circuit when said transceiver is operated in a receive mode.

2. The system of claim 1 wherein said address-decoding circuit includes a timing signal separator circuit for separating said timing signal from other signals on said line, and a counter coupled to said timing signal separator circuit for providing a counter output signal indicative of the presence of said selected time slot on said line during each time period.

3. The system of claim 2 wherein said common circuit means includes a gate having a first input connected to said counter, and wherein said data-signal-receiving circuit includes a data-signal separator circuit for separating data signals on said line from other signals on said line, said data-signal separator circuit being connected to a second input of said gate when said transceiver is in a receive mode for providing an output signal from said gate when a signal is received at both said first and second inputs to said gate indicative of the presence of a data signal on said line in said selected time slot, and wherein said data-signal-transmitting circuit includes a signal input means being connected to said second input of said gate when said transceiver is operated in a transmit mode for providing a gate output signal when a signal is received at both said first and second inputs to said gate, and means coupled to said gate output for sending a data signal onto said line during said selected time slot.

4. The system of claim 2 wherein said pulse-generating circuit includes a sync/clock pulse generator circuit for generating synchronizing timing signals having a first duration for identifying the first time slot of each time period and clock timing signals having a second duration for identifying the subsequent time slots of each time period, and wherein said address-decoding circuit further includes a comparator circuit for separating the synchronizing timing signals from said clock timing signals, said comparator circuit being connected to said counter for resetting said counter at the beginning of each time period.

5. The system of claim 3 wherein said counter includes a plurality of outputs each of which corresponds to a different one of said selected time slots and wherein said first input of said gate is connected to the output of said counter which corresponds to said selected time slot.

6. The system of claim 1 wherein said master unit includes means for normally maintaining the voltage on said line at a first elevated voltage level, wherein said pulse-generating circuit includes means for sending timing signals out over said line at a second elevated voltage level greater than said first voltage level, and wherein said data-transmitting circuit of each transceiver includes means for sending data signals over said line at a third voltage level which is less than said first voltage level.

7. The system of claim 6 wherein each of said transceivers further includes a power supply circuit for rectifying the timing signals on said line for providing power to said transceivers from said line.

8. The system of claim 6 wherein said first voltage is about nine volts, said second voltage is about twelve volts and said third voltage is about three volts.

9. The system of claim 1 wherein each of said time slots is about three milliseconds in length.

10. A time division multiples system in which data signals are adapted to be sent through the system in cyclical fashion during each of a series of time periods, comprising:
    a communication line;
    a master unit connected to said communication line and including timing signal-generating circuitry for sending a plurality of timing signals out over said line for defining a plurality of time slots during each time period;

a plurality of transceivers connected to said communication line, each of said transceivers being connected to a load and including:

an address-decoding circuit for separating said timing signals on said line from other signals on said line and for producing a first output signal indicative of the presence of a selected time slot on said line during each time period;

a data-signal-transmitting circuit for sending a data signal out onto said line during said selected time slot of each time period when said transceiver is operated in a transmit mode; and a data-signal-receiving circuit for receiving a data signal from said line during said selected time slot of each time period when said transceiver is operated in a receive mode, said data-signal-receiving circuit including a data signal separator circuit for separating data signals from other signals on said line and for producing a second output signal indicative of the presence of data signals on said line, said data-signal-transmitting circuit and said data-signal-receiving circuit including a common gate having a first gate input connected to the output of said address-decoding circuit and having a second gate input selectively connected to either said data separator circuit when said transceiver is being operated in a receive mode for providing a gate output signal when said first and second signals are received at said first and second gate inputs indicative of the presence of a data signal on said line in said selected time slot to permit control of said load, or to a signal input means when said transceiver is being operated in a transmit mode for providing a gate output signal when said first signal and said gate input signal are received at said first and second gate inputs to permit a data signal indicative of the condition of said load to be placed onto said line during said selected time slot.

11. The system of claim 10 wherein each of said transceivers further includes a power supply for rectifying said timing signal on said line for providing power to said transceivers.

12. The system of claim 10 wherein said address-decoding circuit includes a timing signal separator circuit for separating timing signals on said line from other signals on said line, and a counter connected to said timing signal separator circuit for counting said timing signals, said counter having a plurality of outputs which correspond to said plurality of time slots, and wherein a time slot is selected by coupling a selected one of said counter outputs to said first gate input.

13. A transceiver for a time division multiplex system which includes a communication line over which data signals are adapted to be sent through the system in cyclical fashion during each of a series of time periods, and timing means for sending a plurality of timing signals over said line for defining a plurality of time slots during each time period during which data signals can be sent over said line, said transceiver being adapted to be connected to said communication line and being selectively operable in either a transmit mode or in a receive mode and including:

an address-decoding circuit for identifying a selected one of said plurality of time slots on said line during each time period, said address-decoding circuit including means for providing an output signal indicative of said selected time slot;

a data-receiving circuit operable when said transceiver is in a receive mode for receiving a data signal from said line during said selected time slot, said data-receiving circuit including a data separator circuit for separating data signals on said line from others signals on said line, and a gate having a first input connected to said output signal providing means and a second input connected to the output of said data separator circuit when said transceiver is operated in a receive mode for providing a gate output signal when a signal is received at both said first and second gate inputs indicative of the presence of a data signal on said line in the selected time slot; and a data-transmitting circuit operable when said transceiver is in a transmit mode for sending a data signal onto said line during said selected time slot, said data-transmitting circuit also including said gate, and wherein said second gate input is connected to a signal input means when said transceiver is operated in a transmit mode for providing a gate output signal when a signal is received at both said first and second gate inputs, and means coupled to said gate output for sending a data signal onto said line during said selected time slot.

14. The transceiver of claim 13 wherein said output signal providing means comprises a counter having a plurality of outputs each of which corresponds to a different one of said plurality of time slots, and wherein said first gate input is connected to the output of said counter which corresponds to said selected time slot.

15. The transceiver of claim 13 wherein said gate comprises a NAND gate.

16. The transceiver of claim 14 wherein said timing signals on said line include synchronizing signals for identifying the first time slot of each time period and clock signals for identifying each subsequent time slot of each time period, and wherein said output signal providing means further includes a clock/sync separator circuit for providing output sync signals indicative of said synchronizing signals, said counter being coupled to said clock/sync separator circuit for receiving said output sync signals for resetting said counter at the beginning of each time period.

17. The transceiver of claim 13 wherein said line is normally maintained at a first voltage level, said timing signals on said line are at a second voltage level greater than said first voltage level and said data signals on said line are at a third voltage level less than said first voltage level, and wherein said address-decoding circuit includes a first comparator circuit for comparing the signals on said line with a first reference voltage and for producing an output when said signals on said line are greater than said first reference voltage, and wherein said data separator circuit comprises a second comparator circuit for comparing the signals on said line with a second reference voltage and for producing an output when said signals on said line are less than said second reference voltage.

18. The transceiver of claim 13 wherein said transceiver further includes a power supply circuit for rectifying said timing signals on said communication line for providing power for said transceiver.

* * * * *

UNITED STATES PATENT AND TRADEMARK OFFICE
CERTIFICATE OF CORRECTION

PATENT NO. : 4,907,222

DATED : March 6, 1990

INVENTOR(S) : William H. Slavik

It is certified that error appears in the above-identified patent and that said Letters Patent is hereby corrected as shown below:

In column 1, line 33, after "fashion" please insert --,--.

In column 1, line 64, after "line" please insert --, a master unit connected to the communication line--.

In column 4, line 2, after "application" please insert --.--.

In column 5, line 46, please delete "give" and substitute therefor --given--.

In column 6, line 67, after "transceiver" please insert --.---.

In column 7, line 12, please delete "signals " and substitute therefor --signals.--.

In column 7, line 48, please delete "tee" and substitute therefor --the--.

UNITED STATES PATENT AND TRADEMARK OFFICE
CERTIFICATE OF CORRECTION

PATENT NO. : 4,907,222

DATED : March 6, 1990

INVENTOR(S) : William H. Slavik

It is certified that error appears in the above-identified patent and that said Letters Patent is hereby corrected as shown below:

In claim 11, column 11, line 43, please delete "signal" and substitute therefor --signals--.

Signed and Sealed this

Twenty-third Day of June, 1992

*Attest:*

DOUGLAS B. COMER

*Attesting Officer*  Acting Commissioner of Patents and Trademarks